United States Patent
Deville et al.

(10) Patent No.: US 10,282,926 B2
(45) Date of Patent: May 7, 2019

(54) CALCULATOR FOR A VEHICLE, SUCH AS A POWER STEERING CALCULATOR, PROVIDED WITH AN INTEGRATED EVENT RECORDER

(71) Applicant: JTEKT EUROPE, Irigny (FR)

(72) Inventors: Jean-Luc Deville, Saint Bonnet de Mure (FR); Pierre-Willem Pilaz, Saint Marcel l'Eclaire (FR)

(73) Assignee: JTEKT EUROPE, Irigny (FR)

( * ) Notice: Subject to any disclaimer, the term of this patent is extended or adjusted under 35 U.S.C. 154(b) by 88 days.

(21) Appl. No.: 15/502,737

(22) PCT Filed: Aug. 4, 2015

(86) PCT No.: PCT/FR2015/052149
§ 371 (c)(1),
(2) Date: Feb. 8, 2017

(87) PCT Pub. No.: WO2016/027022
PCT Pub. Date: Feb. 25, 2016

(65) Prior Publication Data
US 2017/0243412 A1    Aug. 24, 2017

(30) Foreign Application Priority Data
Aug. 22, 2014 (FR) .................................. 14 57935

(51) Int. Cl.
*G07C 5/08* (2006.01)
*G05B 23/02* (2006.01)
(Continued)

(52) U.S. Cl.
CPC ......... *G07C 5/085* (2013.01); *G05B 23/0264* (2013.01); *G06F 11/3013* (2013.01);
(Continued)

(58) Field of Classification Search
CPC .. G07C 5/085; G05B 23/0264; G06F 11/3055
(Continued)

(56) References Cited

U.S. PATENT DOCUMENTS

| | | | | |
|---|---|---|---|---|
| 5,008,823 A | * | 4/1991 | Takahashi | B62D 5/30 180/404 |
| 6,449,540 B1 | * | 9/2002 | Rayner | B60R 1/00 340/901 |

(Continued)

FOREIGN PATENT DOCUMENTS

FR    2 876 814 A1    4/2006

OTHER PUBLICATIONS

IBM Technical Disclosure Bulletin, Jul. 1986, US; Technique for Specifying Logical Trigger Conditions for a Data Collection Device (Year: 1986).*

(Continued)

*Primary Examiner* — Isaac G Smith
(74) *Attorney, Agent, or Firm* — Oliff PLC

(57) ABSTRACT

A computer for a motor vehicle including at least one main control module intended to manage an onboard system such as a power steering system, which uses a plurality of internal variables representative of the successive life situations of the vehicle, the computer including, in addition to the main control module, an integrated monitoring module that includes an extraction and recording unit, placed under the dependency of a trigger unit in order to extract, from a buffer memory, in case of a detection of a predefined alarm event occurring at a triggering time, one or more recordings, that correspond respectively to one or more internal variables, and that each cover a time interval that extends from a start time that precedes the triggering time to an end time that follows the triggering time, and then to store the recording or recordings in a non-volatile memory.

13 Claims, 2 Drawing Sheets

(51) Int. Cl.
*G06F 11/30* (2006.01)
*G06F 11/34* (2006.01)

(52) U.S. Cl.
CPC ...... *G06F 11/3055* (2013.01); *G06F 11/3476* (2013.01); *G07C 5/0816* (2013.01)

(58) Field of Classification Search
USPC .............................................. 701/33.6, 32.2
See application file for complete search history.

(56) References Cited

U.S. PATENT DOCUMENTS

| | | | |
|---|---|---|---|
| 7,921,412 B1 | 4/2011 | Laura | |
| 2005/0033558 A1 | 2/2005 | Schwertfuehrer | |
| 2009/0024274 A1* | 1/2009 | Nagai | G01D 9/005 701/33.4 |
| 2009/0326759 A1* | 12/2009 | Hensel | G06F 8/65 701/31.4 |
| 2010/0002080 A1* | 1/2010 | Maki | G07C 5/0891 348/148 |
| 2010/0171829 A1* | 7/2010 | Yago | G07C 5/0858 348/143 |
| 2011/0060496 A1* | 3/2011 | Nielsen | G06Q 10/0631 701/31.4 |
| 2015/0279127 A1* | 10/2015 | Dato | G07C 5/085 701/32.2 |

OTHER PUBLICATIONS

Oct. 27, 2015 International Search Report issued in International Patent Application No. PCT/FR2015/052149.

* cited by examiner

CALCULATOR FOR A VEHICLE, SUCH AS A POWER STEERING CALCULATOR, PROVIDED WITH AN INTEGRATED EVENT RECORDER

The present invention concerns the electronic calculators for managing on-board systems on vehicles, and more particularly on motor vehicles.

It is known to equip the motor vehicles with one or several calculator(s) (called "ECU" for "Electronic Command Unit"), intended to manage various on-board systems, and in particular with a power train control calculator, a braking system control calculator, a steering control calculator, etc.

However, the multiplication of the calculators as well as of the functions performed by such calculators also tend to multiply the occurrence of defects, which can, in some cases, lead to dangerous situations for the vehicle or for the occupants thereof.

Furthermore, in case of an incident or of an accident, it is generally time-consuming and difficult, if not impossible, to identify with certainty the defect which is truly responsible for the incident, and, a fortiori, to determine the exact origin of said defect.

The objects assigned to the invention aim therefore to overcome the aforementioned disadvantages and to propose a new type of calculator which facilitates the monitoring of the defects and the diagnosis of the origins of such defects.

The objects assigned to the invention are reached by means of a motor vehicle calculator comprising at least one main control module intended to manage an on-board system of said motor vehicle, such as a steering control module intended to manage the power steering system of the vehicle, said main control module using a plurality of internal variables which are representative of the successive life situations of the vehicle and/or of the operation of the on-board system, said calculator being characterized in that it comprises, in addition to the main control module, an integrated monitoring module which comprises:
- an acquisition unit arranged to record in a buffer memory, over a predetermined sliding acquisition period, the values taken successively by one or several internal variable(s) as a function of time,
- a trigger unit arranged, on the one hand, to detect from one or several predetermined trigger condition(s) which relate to one or several internal variable(s), the appearance of an event called "alert event", which corresponds to a predefined life situation of the vehicle or of the on-board system considered to be dangerous or abnormal and, on the other hand, to identify the time, called "trigger time", to which said alert event has occurred,
- an extraction and backup unit, placed dependent on the trigger unit, and arranged, in case of an alert event, to extract from the buffer memory one or several recording(s), which correspond(s) respectively to one or several internal variable(s), and which cover each a time interval extending from a start time that precedes the trigger time by a predetermined duration called "pre-event duration", to an end time that follows said trigger time by a predetermined duration called "post-event duration" and then to store said one or several recording(s) in a non-volatile memory.

Advantageously, directly integrating a monitoring module at the very heart of the calculator which ensures the management of an on-board system (for example, the management of a power steering system), allows said monitoring module to access directly ("at the source") and in real time all data internal to the control module, that is to say any chosen gross internal variable, as acquired, processed or generated by said control module, and this in particular without having to suffer the delays or the losses of information that would be induced by a filtering and/or a transfer of these data to the outside of the calculator.

The processing of the internal variables by the monitoring module, and more particularly the detection of an alert event, is therefore particularly fast and reliable, which optimizes the performances and the reactivity of said monitoring module.

Furthermore, by perceiving immediately a defect (alert event) and by triggering immediately the backup of a recording which goes back in the past (over the pre-event duration) relative to the trigger time which characterizes the appearance (or at least the revelation) of said defect, the monitoring module provides and preserves critical history information to identify the origin of the defect, and more particularly to establish the sequence and the chain of the events which preceded said defect and which led to said defect.

Thanks to the invention, it becomes therefore possible to carry out easily, a posteriori, an accurate and reliable diagnosis of the origin of a defect.

In particular, it is thus possible to establish, from the recordings of a selection of relevant internal variables, which on-board system or which driver or vehicle behavior has failed, and therefore take, where appropriate, the necessary measures to prevent, in the future, the occurrence of such a defect, or limit the consequences therefrom.

Similarly, by keeping a recorded trace of the evolution of these same internal variables, considered to be relevant, after the appearance of the defect, over the post-event duration, then the behavior and the reactions of the on-board system, the vehicle and/or the driver, which are consecutive to the appearance of the defect, can be accurately known by an a posteriori-conducted analysis, and therefore one can check whether the on-board system has responded adequately in accordance with the requirements of its specifications in the interest of safety of the vehicle and its occupants.

Where appropriate, it will be possible in particular to determine in this way if a possible absence of reaction, or an incomplete or inappropriate reaction, of the on-board system comes from an intrinsic failure of said on-board system or the control module thereof, or from an external reason, linked to the failure of another system or else to an inadequate behavior of the driver.

By way of example, it will be understood that a power steering management system, provided with a function of automatically correcting the steering angle of the direction, can be prevented from operating while said system is seeking to urgently correct the path of the vehicle, if the voltage of the battery (external system) supposed to supply the steering assist motor is not sufficient at the considered time.

Ultimately, the retrieval and the backup of information derived from the buffer memory, on either side of the trigger time, will allow reconstituting a posteriori a complete vision of the causes and consequences of a defect.

Advantageously, the non-volatile memory storage of the recording(s) of the internal variables monitored by the monitoring module will allow firstly to preserve durably the recordings, even after erasing the buffer memory, and in particular after the vehicle contact has been switched off, and secondly to keep these recordings available to an diagnostic tool external to the calculator, with which said recordings can be downloaded and analyzed.

The exploitation of data collected by the monitoring module can therefore be achieved very conveniently, in full safety, and at any time deemed appropriate.

Other objects, characteristics and advantages of the invention will appear in more detail upon reading the description which follows, as well as using the annexed drawings, provided for purely illustrative and non-restrictive purposes, among which:

Figure 1:
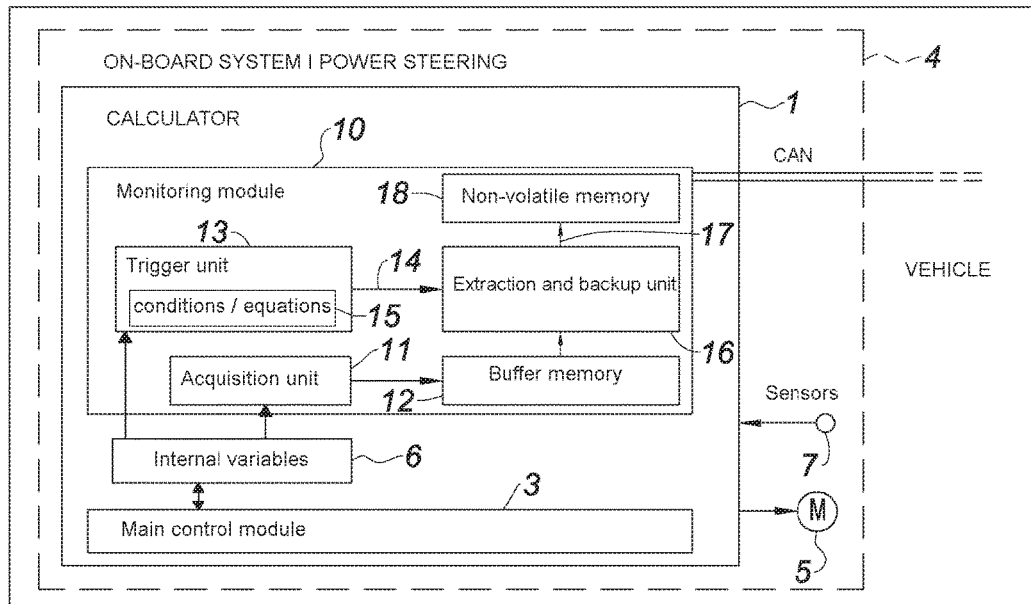
FIG. 1 illustrates, schematically, the general architecture of a calculator according to the invention, comprising an integrated monitoring module.

The present invention concerns an (on-board) calculator 1 of a motor vehicle 2, as schematized in FIG. 1, said calculator 1 comprising at least one main control module 3 intended to manage an on-board system 4 of said motor vehicle 2.

The on-board system 4 can be of any nature, and correspond for example to a system for managing the power train (and in particular for managing the fuel combustion), to a system for managing the braking (in particular an ABS system), to a system for managing the suspension, etc., the calculator 1 can therefore be respectively a power train management calculator, a braking management calculator, a suspension management calculator, etc.

According to a particularly preferred variant, corresponding to that illustrated in FIG. 1, the calculator 2 will constitute a power steering calculator, comprising a steering control module 3 intended to manage the power steering system 4 of the vehicle 2.

In a manner known per se, such a power steering system 4 will comprise a steering wheel mounted on a steering column and which allows the driver to change the steering angle of the steered wheels (preferably drive wheels) of the vehicle, by means of a steering mechanism comprising, for example, a steering rack slidably mounted in a steering housing and which actuates steering tie rods linked to stub axles that carry said steered wheels.

Said steering system 4 will also comprise a preferably electric assist motor 5, arranged to exert on the steering mechanism, where appropriate by means of a reducer of the kind worm wheel and worm screw reducer, a maneuvering force, and more particularly a maneuvering torque, which will be determined by the main control module 3 according to predefined assist laws.

Furthermore, whatever the on-board system 4 driven by the main control module 3, the said main control module 3 uses a plurality of internal variables 6 which are representative of the successive life situations of the vehicle 2 and/or of the operation of said on-board system 4.

Said internal variables 6 can comprise any data processed internally by the calculator 1, and more particularly any data to which the main control module 3 has access, any data acquired by said main control module 3, any data processed by said main control module 3 or generated by said main control module 3 during the operation thereof, and wherein said data will be representative, at the considered time, of a parameter characteristic of the vehicle state (vehicle speed, lateral acceleration, etc.) or more particularly of the on-board system 4 state (position of the steering wheel, motor torque delivered by the assist motor, etc.), or else of a parameter characteristic of the environment of the vehicle (outside temperature, etc.)

The nature and the number of said internal variables 6 can vary in particular depending on the on-board system 4 managed by the control module 3.

By way of example, in the case of a power steering system 4, the internal variables 6 can in particular comprise, or be chosen from: the measurement of the angular position of the steering wheel, the rotation speed of the steering wheel, the measurement of the steering wheel torque that is exerted by the driver on the steering wheel, the measurement of the motor torque provided by the assist motor 5 or the measurement of the torque setpoint applied to said assist motor, the measurement or the estimation of the lateral acceleration or the yaw speed of the vehicle, the supply voltage available at the terminals of the battery that supplies the assist motor, etc.

All or part of said internal variables 6 can be provided by sensors 7 which belong to the on-board system, and which are associated with the calculator 1 and managed by said calculator 1.

In the case of a power steering system 4, said sensors 7 can in particular comprise a sensor of the "resolver" type allowing to determine the position of the steering system, and more particularly the position of the steering wheel, from a measurement of the relative angular position of the assist motor 5 shaft, and/or a magnetic steering wheel torque sensor which measures the deformation of a torsion bar interposed between the steering wheel and the steering column.

Figure 2:
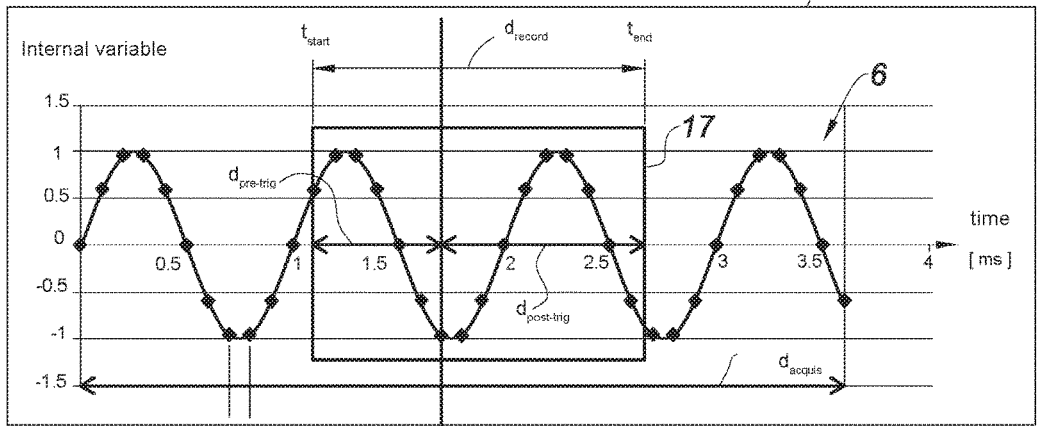
FIG. 2 illustrates, according to a schematic chart, the extraction principle of the recording of a signal representative of the evolutions over time of an internal variable, from the gross recording contained in the buffer memory.
Figure 2:
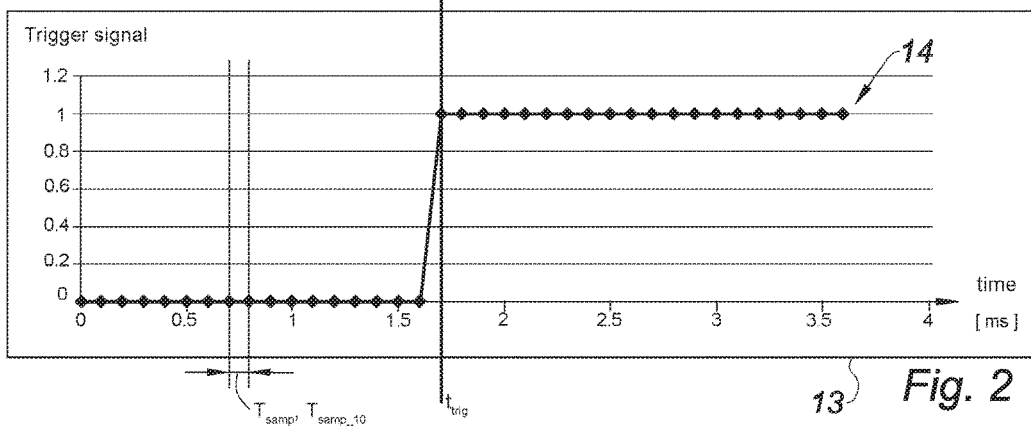

As illustrated in FIG. 2, the internal variables 6 will take advantageously the form of electrical, preferably digital, signals, whose one or several characteristic(s) (amplitude, frequency . . . ) will vary over time depending on the value of the parameter that each of said internal variables represents.

The sampling frequency (refreshing frequency) of said internal variables 6, which can be possibly adjustable, will be defined by the calculator 1.

By way of indication, this sampling frequency will preferably be chosen to be greater than or equal to 1 kHz, in such a way that the sampling period (refreshing period) $T_{ech}$ of the internal variables 6 will be equal to, or even smaller than, 1 ms (one millisecond), as shown in FIG. 2.

According to the invention, and as shown in FIG. 1, the calculator 1 comprises, in addition to the main control module 3, an integrated monitoring module 10.

Within the meaning of the invention, the monitoring module 10 is an integral part of the calculator 1, which will allow an operation of said monitoring module 10 "as close as possible" to the main control module 3, and in particular an acquisition and a particularly fast processing, by said monitoring module 10, of the internal variables 6 which are available within the calculator 1 and which are therefore directly accessible to said monitoring module 10, without passing through an external data exchange network of the type CAN ("Controller Area Network").

Physically, the main control module 3 and the monitoring module 10 will be housed in one and the same calculator 1 casing, where appropriate on the same electronic card, or even within the same microprocessor, which will simplify their implementation within the vehicle 2.

According to the invention, the monitoring module 10 comprises, first of all an acquisition unit 11 arranged to record in a buffer memory 12, over a predetermined sliding acquisition period $d_{acquis}$, the values taken successively by one or several internal variable(s) as a function of time.

The internal variable(s) 6 monitored and recorded thereby can be of course freely chosen depending on the needs.

As long as the monitoring of an internal variable 6 is activated, the acquisition unit 11 carries out a permanent acquisition of said internal variable 6, by recording chronologically, according to a predefined and preferably adjustable sampling frequency, the succession of the instantaneous (gross) values taken by said internal variable 6, each associated with a timestamp information indicating the time at which said value has been observed.

It is thus possible to store temporarily in the buffer memory 12 the history of the signal corresponding to the internal variable 6 over the entire acquisition period $d_{acquis}$, and thus to know and follow precisely the evolutions of said internal variable 6 over this period.

Once the buffer memory 12 is full, that is to say when the stored history extends over a duration equal to the complete acquisition period $d_{acquis}$, then the admission in the buffer memory of a new measurement (value of the internal variable 6 and associated timestamp information) is accompanied by the erasing of the oldest measurement, according to a principle of on-a-loop data recording (and overwriting) of the "first in first out"-type.

By way of indication, the sliding acquisition period $d_{acquis}$ can be comprised substantially between a few hundred microseconds and several tens of seconds.

Thus, the sliding acquisition period $d_{acquis}$ can for example be greater than or equal to 200 µs, 500 µs, or even equal to or greater than 1 s, 5 s or 10 s.

Furthermore, the sliding acquisition period $d_{acquis}$ can for example be smaller than or equal to 300 s, to 150 s, to 120 s, or even to 30 s, or to 20 s.

In all cases, the size of the memory space allocated to the buffer memory 12 will then be defined accordingly.

According to the invention, the monitoring module 10 then comprises a trigger unit 13 arranged, on the one hand, to detect from one or several predetermined trigger condition(s) which relate to one or several internal variable(s) 6, the appearance of an event called "alert event", which corresponds to a predefined life situation of the vehicle 2 or of the on-board system 4, and here more particularly to a life situation (of the vehicle 2 or of the on-board system 4) considered to be dangerous or abnormal (typically because said life situation corresponds to a malfunction of the on-board system 4, or to a behavioral anomaly of the vehicle, which leads or is likely to cause a loss of control of the vehicle and/or an endangerment of the occupants of said vehicle or of the other road users, and/or possibly a damage to the vehicle) and, on the other hand, to identify the time, called "trigger time" $t_{trig}$, to which said alert event has occurred.

Advantageously, the trigger unit 13 monitors in real time one or several internal variable(s), called "detection variables", chosen from the internal variables 6 available within the calculator 1, in such a way that, when the evolution of said detection variable(s) causes this detection variable, respectively these detection variables, to satisfy a trigger condition, or a simultaneous combination of several (cumulative) trigger conditions, then the trigger unit 13 diagnoses an alert state and emits a trigger signal 14.

The moment that the trigger condition(s) is/are satisfied, that is to say in practice, the emission time of said trigger signal 14, marks the trigger time $t_{trig}$.

By way of example, a trigger condition can be defined as the crossing of a threshold by the concerned internal variable 6.

Thus, for example, in the case of a power steering system 4, a trigger condition can be defined as exceeding a critical yaw speed threshold indicating a grip loss of the vehicle.

The monitoring of the appearance of such a threshold crossing condition can then be carried out by a simple comparison operation of the instantaneous value of the concerned internal variable 6 with the predefined threshold (said comparison returning, for example, the TRUE value if the threshold is crossed, the FALSE value otherwise).

Of course, any particular life situation of the vehicle 2 or of the on-board system 4 which will be considered, at one time or another in the life of the vehicle 2, as likely to be of interest, in particular with regard to statistical studies or to improvement of the safety of the occupants of the vehicle, may be the subject of a definition by means of appropriate trigger conditions, and therefore the subject of a search (i.e. the subject of a monitoring for detection) by the trigger unit 13.

Of course, the alert event which causes the emission of the trigger signal 14 can correspond in practice to a combination (to a simultaneous occurrence) of several "elementary" events, each defined by one or several trigger condition(s) which are specific to the considered elementary event.

By way of example, it could be possible to define a particular abnormal life situation (an alert event) of the type "understeering vehicle with impossibility to correct automatically the trajectory due to supply failure" which would correspond to the simultaneous combination, on the one hand, of a first elementary alert event of the type "loss of grip in understeering situation", which would be characterized by some conditions on the internal variables 6 which represent the yaw speed of the vehicle and the angular position of the steering wheel and, on the other hand, of a second elementary alert event of "loss of supply of the assist motor" which would be characterized by the passage and/or maintaining of the internal variable measuring the battery voltage under a predetermined low threshold.

Preferably, the trigger condition(s) is/are expressed by one or (respectively) more Boolean equation(s) (Boolean expressions) whose binary result forms, when said binary result switches, a trigger signal 14 marking the trigger time $T_{trig}$, as illustrated in FIG. 2.

More particularly, the value of the trigger signal 14 will be preferably equal to 1 (one) if the trigger condition(s) is/are fulfilled, to 0 (zero) otherwise.

The use of a relatively intuitive Boolean language, will allow formalizing the trigger condition(s) in the form of logical instructions, according to a syntax that is both rigorous and relatively simple to implement.

Preferably, for the syntax of the Boolean equation(s) defining the trigger condition(s), a reverse polish notation (according to which the operators are given after the operands) will be further used, in order to gain in rapidity of processing and interpretation of said equations.

Advantageously, the refreshing of the Boolean equation, and therefore of the result thereof, takes place automatically at each refreshing of one or the other of the internal variables 6 which are taken into consideration in said equation.

The trigger unit 13 is therefore particularly reactive.

Preferably, the trigger condition(s) is/are expressed by one or more equation(s) (Boolean expressions) contained in an editable file 15.

It is therefore possible to configure the trigger unit 13 very freely, by simply intervening on the content of said editable file 15, that is to say by editing, adding, deleting, or by selectively activating/deactivating, according to the needs, one or several equation(s) contained in said file 15, without the need to modify intrinsically the general operating (hardware and/or software) architecture of the trigger unit 13, and more globally the operating architecture of the monitoring module 10 and of the calculator 1, and in particular without the need to reprogram intrinsically the calculator 1.

As such, the trigger unit 13 contains preferably a command interpreter capable of reading the editable file 15 in order to interpret and execute the equations contained in said file 15 (as so many command lines directly understandable by said interpreter).

Said command interpreter will be more particularly capable of interpreting the syntax of a Boolean expression, by having a knowledge of the Boolean language, in particular of the Boolean operators, such as AND, OR, NOT, XOR, NOR, NAND, IF . . . THEN, of the parentheses operator, but also of the current mathematical operators such as: greater than, smaller than, addition, subtraction, multiplication, division, power, root, absolute value, etc.

The definition of the trigger condition(s), and more globally the definition of the operating modalities of the trigger unit 13, can therefore be carried out by means of a very intuitive language, without requiring a compilation, and can be modified as often as necessary by a simple intervention on the equation(s) contained in the editable file 15, thus giving the monitoring module 10 a large flexibility.

The intervention on the editable file 15 can be carried out, for example, in workshop through the diagnostic socket of the vehicle.

According to a possible implementation of the invention, it is perfectly possible to provide the file 15 by default, in factory, with a set (reserve) of several equations (of several trigger conditions), wherein at least some of said equations will be left inactive by default, and will be activated subsequently to the circulation of the vehicle, only if necessary, in some particular circumstances.

For example, the activation of some equations might be considered during a workshop, following a vehicle safety recall which would lead to monitor some vehicle behaviors with an increased vigilance, or else the activation of some equations on the initiative of another calculator on-board the vehicle 2, which would have automatically detected the crossing of a some degree of aging of the vehicle, or abnormalities, or risk behaviors of said vehicle which would justify installing particular monitoring measures (for example, in order to complete the information of the mechanic during a next servicing of the vehicle).

Conversely, in order to lighten the load of the monitoring module 10, one or several equation(s) can be (re-)put on standby (i.e. deactivated) when the latter have no longer any usefulness.

According to the invention, the monitoring module 10 comprises finally an extraction and backup unit 16, placed dependent on the trigger unit 13, and arranged, in case of an alert event (and more particularly in case of a perception of a trigger signal 14), to extract from the buffer memory 12 one or several recording(s) 17, which correspond respectively to one or several internal variable(s), and which cover each a time interval $d_{record}$ extending from a start time $t_{start}$ that precedes the trigger time $t_{trig}$ by a predetermined duration called "pre-event duration" $d_{pre-trig}$ (so that $t_{start} = t_{trig} - d_{pre-trig}$), to an end time $t_{end}$ that follows said trigger time $t_{trig}$ by a predetermined duration called "post-event duration" $d_{post-trig}$ (so that $t_{end} = t_{trig} + d_{post-trig}$), as shown in FIG. 2, then to store said one or several recording(s) 17 in a non-volatile memory 18.

Advantageously, the monitoring module 10 according to the invention, called "perturbograph" ("disruption-graph"), therefore makes it possible, in case of an alert event, to extract from the buffer memory 12 and transfer to the non-volatile memory 18, before said buffer memory 12 is erased, a recording 17 which covers a temporal sub-interval (a window) $d_{record}$ of the sliding acquisition period $d_{acquis}$, in order to retain partially the data relating to the monitored internal variable(s) 6, exclusively over a time range $d_{record}$ which is just necessary and sufficient to enable understanding the causes of the alert event (by going back in the past over the pre-event duration $d_{pre-trig}$ relative to the trigger time $t_{trig}$) and the possible consequences of said alert event (by including in the recording the post-event duration $d_{post-trig}$).

Advantageously, the monitoring module 10 can therefore act as a selective "black box", which collects and keeps data samples (the recordings 17) of limited size, corresponding only to periods that are useful for the understanding of the defects, wherein each backed-up recording 17 begins (slightly) before the trigger time $t_{trig}$, that is to say before the equations (of detection of the alert event) have returned the TRUE value, and ends (slightly) after said trigger time $t_{trig}$, that is to say after the equations have returned the TRUE value (that is to say returned a trigger signal 14 equal to 1) for the considered alert event.

Thus, the monitoring module 10 allows avoiding any loss of information which would be caused by a recording which would take place too late relative to the alert event (and would not allow to understand the causes of said event), or else the irreversible loss of information which would be due to a (loop) sliding erasing of the buffer memory 12, and this although using a reduced size storage space (both for the buffer memory 12 and the non-volatile memory 18), since it is not necessary to proceed to a definitive and exhaustive storage of all data concerning the evolution of the internal variables 6, but only to a partial selective backup of the only relevant samples (recordings 17).

As such, it should be noted that, by carrying out the extraction and the backup of the recordings 17 selectively and therefore intermittently, that is to say not permanently, whenever an alert event occurs but only when an alert event occurs (whereas, on the contrary, the "gross" sliding acquisition of the internal variables 6 by the acquisition unit 11, and therefore the temporary storage of said variables in the buffer memory 12, is permanent, so as not to risk losing an information which could potentially be useful subsequently), finally, an information (here a recording 17 of internal variables 6) is kept in a sustainable manner in the non-volatile memory 18 only if said information is relevant because a link exists between said information and an alert event.

The duration of each recording $d_{record}$, and more particularly the pre-event duration $d_{pre-trig}$ as well as the post-event duration $d_{post-trig}$, can, where appropriate, be determined and adjusted on a case-by-case basis, for example according to the nature of the alert event which is monitored and which serves as a trigger for the backup of recordings 17.

By way of indication, the pre-event duration $d_{pre-trig}$ can be set to a value, preferably an adjustable value, comprised between 5% and 95% of the desired recording duration $d_{record}$.

Of course, the pre-event duration $d_{pre-trig}$ will be greater than the sampling period $T_{samp}$ of the internal variables 6, and for example greater than or equal to three times, five times, ten times said sampling period $T_{samp}$ (or even more), so that the recording 17 can trace a significant history, by means of a representative sample containing a sufficient series of measurements of the concerned internal variable(s).

By way of indication, said pre-event duration $d_{pre\text{-}trig}$ can be equal to or greater than 5 ms, 10 ms, 50 ms, 100 ms, and even greater than 1 s, 5 s, 10 s or even 30 s.

In an analogous manner, the preferably adjustable, post-event duration $d_{post\text{-}trig}$, will be set to a complementary value to the pre-event duration $d_{pre\text{-}trig}$ to reach the desired total recording duration $d_{record}$.

Here again, the post-event duration $d_{post\text{-}trig}$ will be greater than the sampling period $T_{samp}$ of the internal variables 6, and for example greater than or equal to three times, five times, ten times the sampling period (or more).

By way of indication, the post-event duration $d_{post\text{-}trig}$ can be equal to or greater than 5 ms, 10 ms, 50 ms, 100 ms, and even greater than 1 s, 5 s, 10 s or even 30 s.

The non-volatile memory 18 can be, for example, a Flash or EEPROM memory, which preserves the data of the recordings 17 so that said data can be read after the calculator 1 is turned off.

Within this non-volatile memory 18, the recordings 17 can for example be archived and indexed in a structure of the type database.

Of course, the non-volatile memory 18 can be dimensioned so as to be able to contain multiple recordings 17.

This ability to store a plurality of recordings 17 can in particular allow to store several repeated recordings of the same nature, that is to say all relating to the same internal variable or the same group of internal variables and carried out successively at different times, and/or several recordings of a distinct nature, that is to say relating to internal variables (or groups of internal variables) which are different from one recording to another, and which might furthermore have been carried out either simultaneously or at different times.

In particular, the invention can in particular allow to carry out several successive recordings 17 (of the same internal variables) corresponding to several occurrences of an alert event of the same nature, that is to say corresponding to several successive distinct triggering of the extraction and backup unit 16 which are based on the repeated detection of the same trigger condition (that is to say when a same equation repeatedly switches to and outputs a value TRUE).

Where appropriate, it will be possible to measure a posteriori the appearance frequency (repetition frequency) of a particular alert event type, and to study in the different cases, for example for statistical purposes, the causes of this type of event as well as the reactions of the on-board system 4 to this type of event.

Whatever their nature and volume, the recording data stored in the non-volatile memory 18 will be advantageously searchable by an analysis apparatus external to the calculator 1, which can for example connect on the diagnostic socket of the vehicle 2, or even interrogate the monitoring module 10 by remote transmission.

These data can also, where appropriate, be exported from the non-volatile memory 18 internal to the calculator 1 to an external (distant) storage medium, of the type flash memory or hard disk, which will be connected, temporarily or definitely, to said calculator 1, for example via the onboard network CAN.

Of course, it may be perfectly considered to provide, in addition to the equations intended for the automatic and permanent monitoring of the appearance of an alert event, a possible triggering of the extraction and backup unit 16 by an external trigger signal 14 coming, for example, from another distant calculator on-board the vehicle 2 or from any other apparatus external to the calculator 1.

The trigger signal of external origin can then for example be routed to the calculator 1, and more particularly to the monitoring module 10, by the onboard network CAN, or by radiofrequency.

According to a particularly preferential possible implementation, the main control module 3 and the monitoring module 10 (and more particularly the substructures of said monitoring module 10 constituted by the acquisition unit 11, the buffer memory 12, the trigger unit 13, the extraction and backup unit 16 and/or the non-volatile memory 18) are virtual modules, obtained by programming the calculator 1.

In practice, each module 3, 10, respectively each unit 11, 13, 16, will thus be preferably programmed, in the form of a set of instructions, present in an electronic circuit of the calculator 1, to carry out the specific tasks assigned thereto, as these tasks have been described in the foregoing.

Advantageously, such a virtual structure will make the monitoring module 10 particularly easy to implant, possibly in retrofit, on any existing calculator 1, without particular additional costs or constraints.

Further, such a virtual structure requires few resources, since it suffices to allocate memory space, in the existing calculator 1, for executing the tasks specific to the monitoring module 10 and for recording data linked to the monitoring of the internal variables 6.

Advantageously, the main control module 3, and the monitoring module 10 joined thereto according to the invention, can share a single hardware structure, and in particular common clock and cache memory.

The integration of a monitoring module 10 according to the invention, which does not require any addition of physical equipment, therefore has no negative influence on the compactness and lightness of the calculator 1, and therefore more globally on the volume and the weight of the on-board system 4 or the vehicle 2.

Preferably, the response time of the monitoring module 10, and more particularly the response time of the acquisition unit 11 and of the trigger unit 13 of said monitoring module 10, is equal to or smaller than one millisecond (1 ms), from the refreshing time, within the main control module 3, of one or the other of the concerned internal variables 6.

Thus, the monitoring module 10 is particularly reactive, since, as soon as a change in situation (a change in value of one or several internal variable(s) 6) is manifested internally in the calculator 1, this change is taken into consideration and processed by monitoring module 10, almost in real time.

By comparison, if the internal variables 6 had to transit through the onboard network CAN to reach an external monitoring module, a delay of about 10 ms to 100 ms would be observed immediately, merely due to the transfer of said internal variables.

For instance, the very short response time (cycle time), smaller than one millisecond, is advantageously made possible by internally integrating the monitoring module 10, and enables triggering the backup of a recording 17 immediately upon the occurrence of an alert event, without delay and therefore without risk of losing the useful information, thus making possible to have a complete and detailed history and thus to establish a precise diagnosis of the origins and consequences of the alert event.

Thanks to the very short response time of the monitoring module 10, the sampling frequency $1/T_{samp\_10}$, at which the internal variables 6 will be read, refreshed and processed by the monitoring module 10, may be particularly high, preferably greater than or equal to several hundreds of Hz, or even greater than or equal to 1 kHz, and for example may be comprised between 100 Hz and 20 kHz, which will allow to collect, for each event, however brief said event is, and for each of the monitored internal variables 6, a recording 17 which will comprise a large number of data.

Whatever the alert event is, and in particular in the case of an event is both brief and serious (for example corresponding to a loss of control of the vehicle at high speed, causing said vehicle to leave the road) the invention will therefore make it possible to describe a posteriori said event in a complete and accurate manner.

The sampling period $T_{samp\_10}$ (and thus the sampling frequency $1/T_{samp\_10}$) of the monitoring module 10 may be advantageously programmable, in order to adapt the reactivity of said monitoring module 10 to the circumstances, and in particular to the searched and monitored type of alert event.

According to a preferential possibility of implementation, the refreshing and processing frequency of the internal variables 6 (sampling frequency $1/T_{samp\_10}$) at the acquisition unit 11 and the trigger unit 13 is identical to the refreshing frequency ($1/T_{samp\_10}$) of said internal variables 6 within the main control module 3.

In other words, the monitoring module 10 will be able to benefit from an excellent time resolution, particularly fine, providing sid monitoring module 10 with a very high reactivity and a high accuracy, due to the fact that said module may be clocked at the same clock frequency as the main control module 3, that is to say at the internal clock frequency specific to the calculator 1.

The integration of the monitoring module 10 with the calculator 1 allow therefore to synchronize said monitoring module 10 at high speed on the main control module 3, and thus to avoid any delay in detecting and recording the alert events.

Preferably, the (useful) bandwidth of the monitoring module 10 is greater than or equal to 1 Mbit/s, to 1.5 Mbit/s or even to 2 Mbit/s of useful data (payload) for recording and storing the internal variables 6.

By way of indication, the acquisition unit 11 can be capable of recording 50 (fifty) internal variables 6 of 2 (two) to 4 (four) bytes each at each refreshing cycle of one millisecond, and the extraction and backup unit 16 can be capable of outputting and backing up the same therefrom.

The useful data flow rate (or "useful bandwidth", "payload bandwidth"), that is to say the data flow rate containing effective information as to the internal variables 6 (value and time of measure of said internal variables) can thus in practice be, within the monitoring module 10, greater than, and in particular at least five times greater than, the useful data flow rate of the vehicle onboard network CAN (said network CAN having an absolute bandwidth of about 500 kbps to 1 Mbps, or in practice a useful data flow rate (payload) of about 100 kbps to 200 kbps).

Thanks to these particularly high internal transfer rates, which are made in particular possible by the fact that the monitoring module 10 can directly access the internal variables 6 of the main control module 3, without the need to transit said internal variables by a network of CAN type external to the calculator 1, the monitoring module 10 will be particularly efficient.

Furthermore, the extraction and backup unit 16 comprises preferably safety devices, such as encryption keys, write protections and/or access restrictions (for example by password), preventing the alteration or falsification of the recordings 17 stored in the non-volatile memory 18.

The authenticity of the collected information can thus be guaranteed, which allows, where appropriate, to perform a posteriori a reliable expertise of the alert event(s) that has triggered the recordings 17.

Furthermore, arrangements will be taken to ensure that the monitoring module 10 is not itself a defect source, and more particularly to ensure that the operation of said monitoring module 10 does not interfere with the normal operation of the main control module 3, and therefore does not threaten the safety of the vehicle, of its occupants or of the other road users.

For this purpose, the monitoring module 10 will have preferably only a read-only access, and not a write access, to the internal variables 6 used by the main control module 3.

Advantageously, such a protection, of the "Memory Protection Unit" type, will guarantee that the monitoring module 10 does not interfere with the control module 3, and more particularly that the exploitation and the recording of the internal variables 6 by the monitoring module 10 does not alter the reliability of said internal variables, on the basis of which the main control module 3 makes decisions and decides on the reactions of the vehicle 2.

For similar reasons, the calculator 1 can comprise a checking module (not shown) arranged to control the speed of execution of the main control module 3 in order to ensure that said main control module 3 is not slowed down by the monitoring module 10.

Such checks, of the "Process Flow Control" type, can in particular comprise timing the passage of the control module 3 by some predefined checkpoints, which consist, for example, in the restitution of some data (internal variables 6) or the execution of some periodic operations by said control module 3, and this so as to check the absence of delay or drift in the speed of execution of the algorithms implemented by said control module 3.

Figure 3:
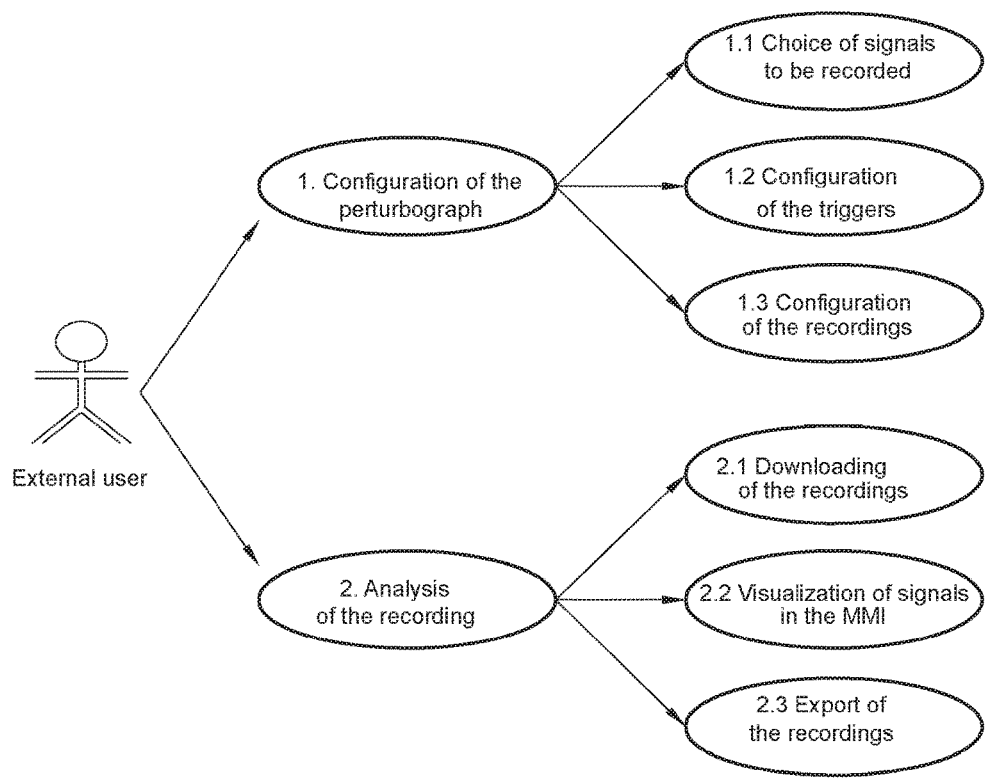
FIG. 3 illustrates, according to a schematic view, the possible interactions between an external user and a calculator equipped with a monitoring module according to the invention, including the configuration actions of said monitoring module, and the remote interrogation actions of said monitoring module.

FIG. 3 illustrates several types of communication and possible interactions between an external user and the calculator 1, and more particularly the monitoring module ("perturbograph") 10.

The first type of communication (referenced as 1 in FIG. 3) concerns the configuration operations of the monitoring module 10, in factory or in workshop, by means of an external apparatus.

In particular, several configuration parameters can thus be filled, where appropriate, by means of suitable menus, such as, with reference to FIG. 3:
 the list of internal variables 6 (signals) to be monitored (by the acquisition unit 11) and internal variables 6 to be recorded (by the extraction and backup unit 16), as shown in the item 1.1;
 the trigger conditions, that is to say the equations that trigger the recording, and, where appropriate, the re-triggering equations that make possible to control the generation and the storage of several consecutive recordings 17, as shown in the item 1.2;
 the pre-event $d_{pre\text{-}trig}$ and post-event $d_{post\text{-}trig}$ durations which allow to set the duration of the recordings 17, as well as the size of each recording 17 (whether it is the elementary size, in bytes, of the coding of each data, and/or the overall size of the maximum memory space allocated to each recording) and/or the maximum number of recordings 17 authorized in the non-volatile memory 18, as shown in the item 1.3.

The second type of communication (referenced 2 in FIG. 3) concerns the interrogation and analysis of the recording data collected by the perturbograph 10.

As such, as illustrated in FIG. 3, the data of the recordings 17 can be:
- downloaded, for example by a recorder apparatus connected to the calculator 1 or to the network CAN (item 2.1);
- displayed, for example in the form of time graphs, in a man-machine interface ("MMI", item 2.2);
- exported in various formats in order to be used in numerical simulation or calculation tools such as Excel™ or MatLab™ (item 2.3).

Of course, the invention also relates, as such, to the use, within an on-board calculator 1, and more specifically within a power steering calculator 1, of a monitoring module 10 according to either one of the described characteristics in the foregoing, in order to record (and back up), when one or several predetermined alert event(s) occur(s), the evolution of one or several variable(s) 6 internal to the calculator 1 before and after the occurrence time of said event (that is to say before and after the trigger time $t_{trig}$).

Thus, the invention will relate to the integration, within a same calculator 1 casing (provided with mating connectors adapted to the on-board system 4 and to the onboard network CAN), of a main control module 3 and of a monitoring module 10, so as to optimize the joint operation (at a high, preferably common, clock) of these two modules.

An example, among others, of application of the invention to a power steering system 4 could consist in monitoring, on the one hand, dynamic parameters of the vehicle, such as the linear speed and the yaw speed and, on the other hand, power steering parameters, such as the angular position and the rotation speed of the steering wheel, as well as the motor torque setpoint applied to the assist motor, and finally the available battery voltage for supplying said assist motor.

It would then be possible to set as a trigger condition the appearance of a situation of grip loss of the vehicle characterized, for example, by a too low yaw speed (understeer) or on the contrary, too high yaw speed (oversteer) with regard to the steering wheel angle and the linear speed of the vehicle.

The recording 17 could then comprise the dynamic parameters of linear speed and yaw speed, the position of the steering wheel and the steering wheel speed, the motor torque setpoint and the battery voltage.

Thus, if the steering system 4 comprises an automated function of trajectory correction, it will be possible to check, with regard to the evolution of these parameters, if said function has executed correctly the mechanically possible correcting maneuvers of the vehicle.

In the event of failure, it may in particular be checked whether the loss of control of the vehicle has resulted from an intrinsic malfunction of the trajectory correction function (for example from a calculation error or a delay in applying the motor setpoint), or else from a failure external to the system 4, for example a drop in the battery voltage which would have prevented the assist motor 5 from developing a sufficient torque to reach the fixed setpoint.

Of course, the invention is in no way limited to the variants described in the foregoing, the person skilled in the art being in particular capable of freely isolating or combining together either one of the aforementioned characteristics, or else of substituting equivalents thereto.

In particular, as mentioned above, the invention can be applied to any type of calculator 1 on board any vehicle, in particular a vehicle intended to transport goods and/or persons.

Further, the invention of course relates, as such, to a vehicle 2 monitoring method, method whose characteristics, steps and functions, advantageously implemented by the calculator 1, modules 3, 10 and units 11, 13, 16 can be deduced mutatis mutandis from the description of said calculator 1, of said modules 3, 10 and of said units 11, 13, 16.

In particular, said monitoring method will thus comprise an acquisition step (a) during which are recorded, in a buffer memory 12, over a predetermined sliding acquisition period $d_{acquis}$, the values taken successively as a function of time by one or several internal variable(s) 6 used by a main control module 3 intended to manage an on-board system 4 of the vehicle 2, an analysis and trigger step (b) during which is/are analyzed one or several predetermined trigger condition(s) which relate to one or several internal variable(s) 6 so as to detect the appearance of an event called "alert event", which corresponds to a predefined life situation of the vehicle 2 or the on-board system 4 considered to be dangerous or abnormal and, if an alert event is detected, the time called "trigger time" $t_{trig}$, to which said alert event has occurred, is identified, then a conditional extraction and backup step (c), which is executed if (and only if) an alert event is actually detected during the analysis and trigger step (b), and during which are extracted from the buffer memory 12 one or several recording(s) 17, which correspond(s) respectively to one or several internal variables (6), and which cover each a time interval $d_{record}$ extending from a start time $t_{start}$ preceding the trigger time $t_{trig}$ by a predetermined duration called "pre-event duration" $d_{pre-trig}$, to an end time $t_{end}$ following said trigger time $t_{trig}$ by a predetermined duration called "post-event duration" $d_{post-trig}$ then said recording(s) 17 are/is stored in a non-volatile memory 18.

The invention claimed is:

1. A calculator for a motor vehicle, the calculator comprising:
   at least one main control module executed by a processor configured to manage a power steering system of the motor vehicle and configured to use a plurality of internal variables that are representative of at least one of successive life situations of the vehicle and operation of the power steering system, the internal variables representative of the operation of the power steering system being provided by sensors of the power steering system; and
   an integrated monitoring module executed by a processor configured to:
   record in a buffer memory, over a predetermined sliding acquisition period, values taken successively by one or several of the internal variables as a function of time, an oldest one of the values being erased from the buffer memory and replaced by a newest one of the values when a duration covered by the recorded values equals the predetermined sliding acquisition period,
   detect, from one or several predetermined trigger conditions that relate to one or several of the internal variables, an event called an "alert event", which corresponds to a predefined one of the life situations of the vehicle or of the power steering system considered to be dangerous or abnormal,
   identify the time, called "trigger time," at which the alert event occurred, in case of detection of the alert event, extract from the buffer memory one or several recordings, which correspond respectively to one or several of the internal variables and each cover a time interval extending from (i) a start time that precedes the trigger time by a predetermined duration called "pre-event duration" to (ii) an end time that follows the trigger time by a predetermined duration called "post-event duration", and then store the one or several recordings in a non-volatile memory.

2. The calculator according to claim 1, wherein a response time of the integrated monitoring module is equal to or smaller than one millisecond from a refresh time of any one of the plurality of internal variables used by the at least one main control module.

3. The calculator according to claim 1, wherein a refreshing and a processing frequency of the internal variables at the integrated monitoring module is identical to a refreshing frequency of the internal variables within the at least one main control module.

4. The calculator according to claim 1, wherein bandwidth of the integrated monitoring module is greater than or equal to 1 Mbit/s.

5. The calculator according to claim 1, wherein the one or several predetermined trigger conditions are expressed by one or more Boolean equations whose binary result forms, when a binary result switches, a trigger signal marking the trigger time.

6. The calculator according to claim 5, wherein a reverse Polish notation is used for the syntax of the one or more Boolean equations defining the one or several trigger conditions.

7. The calculator according to claim 1, wherein the one or several trigger conditions are expressed by one or several equations contained in a editable file, and the processor of the integrated monitoring module contains a command interpreter capable of reading the file in order to interpret and execute the equations.

8. The calculator according to claim 1, wherein the processor of the integrated monitoring module comprises safety devices that prevent the recordings stored in the non-volatile memory from being altered or falsified.

9. The calculator according to claim 1, wherein the integrated monitoring module has only read-only access, and not write access, to the internal variables used by the at least one main control module.

10. The calculator according to claim 1, wherein the at least one main control module and the monitoring module are virtual modules, obtained by programming the respective processors.

11. The calculator according to claim 1, wherein the processors of the at least one main control module and the monitoring module are the same.

12. The calculator according to claim 1, wherein the internal variables representative of the operation of the power steering system comprise at least one of: (i) measurement of angular position of a steering wheel of the power steering system; (ii) rotation speed of the steering wheel; (iii) measurement of torque exerted by a driver of the motor vehicle on the steering wheel; (iv) measurement of torque provided by an assist motor of the power steering system; (v) measurement of a torque setpoint applied to the assist motor; (vi) measurement or estimation of lateral acceleration of yaw speed of the vehicle; and (vii) supply voltage available at terminals of a battery that supplies the assist motor.

13. A system for a motor vehicle, comprising:
a power steering system comprising:
a steering mechanism that, by way of a steering wheel, allows a driver of the vehicle to change a steering angle of wheels of the vehicle, and
an assist motor configured to exert force on the steering mechanism; and
a calculator for the motor vehicle, the calculator comprising:
at least one main control module executed by a processor configured to manage the power steering system of the motor vehicle and configured to use a plurality of internal variables that are representative of at least one of successive life situations of the vehicle and operation of the power steering system, the internal variables representative of the operation of the power steering system being provided by sensors of the power steering system, and
an integrated monitoring module executed by a processor configured to:
record in a buffer memory, over a predetermined sliding acquisition period, values taken successively by one or several of the internal variables as a function of time, an oldest one of the values being erased from the buffer memory and replaced by a newest one of the values when a duration covered by the recorded values equals the predetermined sliding acquisition period,
detect, from one or several predetermined trigger conditions that relate to one or several of the internal variables, an event called an "alert event", which corresponds to a predefined one of the life situations of the vehicle or of the power steering system considered to be dangerous or abnormal,
identify the time, called "trigger time," at which the alert event occurred,
in case of detection of the alert event, extract from the buffer memory one or several recordings, which correspond respectively to one or several of the internal variables and each cover a time interval extending from (i) a start time that precedes the trigger time by a predetermined duration called "pre-event duration" to (ii) an end time that follows the trigger time by a predetermined duration called "post-event duration", and
then store the one or several recordings in a non-volatile memory,
wherein the sensors of the power steering system from which the at least one main control module obtains the internal variables representative of the operation of the power steering system comprise at least one of (i) a revolver type sensor configured to determine a position of the power steering system by way of measurement of an angular position of a shaft of the assist motor and (ii) a magnetic steering wheel torque sensor.

* * * * *